UNITED STATES PATENT OFFICE 2,306,338

PINACOLS AS INSECTICIDES

William F. Hester, Drexel Hill, Pa., assignor to Röhm & Haas Company, Philadelphia, Pa., a corporation of Delaware No Drawing. Application August 12, 1941, Serial No. 406,481

6 Claims. (Cl. 167—30)

This invention relates to insecticidal compositions containing as an active insecticidal agent a pinacol having at least two symmetrical phenyl substituents, or the corresponding dehydrated and rearranged product from such pinacol, known as a pinacolone, or a mixture of said pinacol and pinacolone.

The preparation of pinacols, also known as pinacones, by various methods is known. They may be mad from ketones by electrolytic reduction, by reduction with a metal such as zinc or sodium in an amalgam, or by reduction under the influence of sunlight in the presence of an easily oxidized substance, such as isopropanol or other alcohol. The pinacols are readily dehydrated with rearrangement to the corresponding pinacolones.

It has been found that the pinacols having at least two sym-phenyl groups and the corresponding pinacolones are remarkably effective poisons against chewing insects. At the same time these pinacols and pinacolones are free from phytocidal action. Because of this favorable balance of high insecticidal activity and low phytocidal action these compounds are exceptionally useful in parasiticidal compositions.

The pinacols which have been found to be thus effective are those which contain phenyl nuclei as symmetrical substituents of the two hydroxyl-bearing carbon atoms together with other substituents to satisfy the valences of these carbon atoms. The phenyl groups may carry other groups such as halogen, nitro, alkoxy, aryloxy, acyl, alkyl, cycloalkyl, aryl, etc. The effective pinacols may be represented by the general formula:

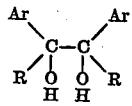

wherein Ar represents a phenyl nucleus and R represents an aliphatic hydrocarbon group or a phenyl group. Similarly effective are the pinacolones resulting from these pinacols by well-known rearrangement. Since this rearrangement takes place readily, it is theoretically possible that the pinacols may become effective through the change to pinacolones.

Typical of the benzpinacols are the following:

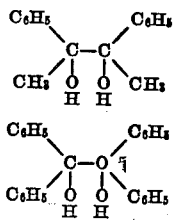

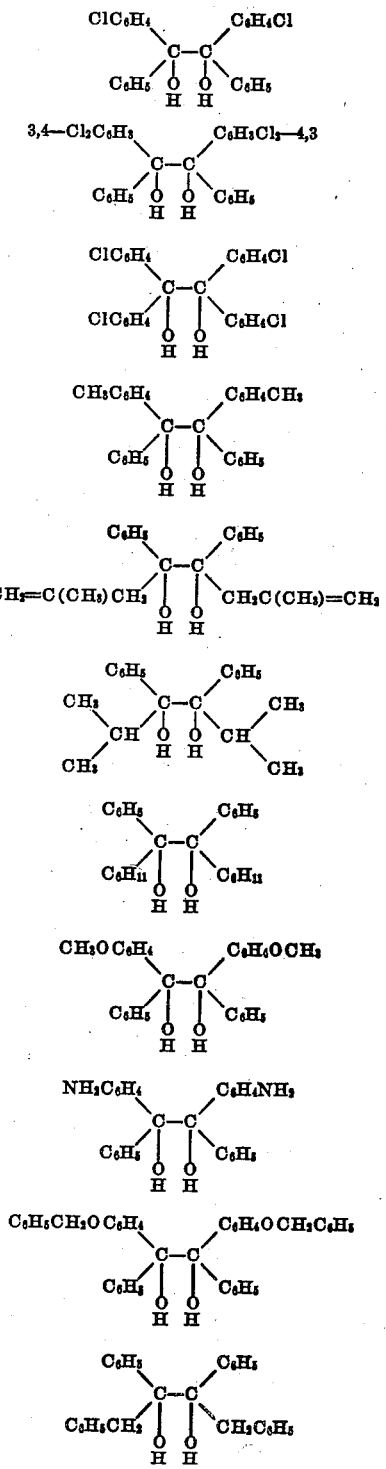

and corresponding pinacolones:

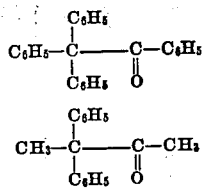

or

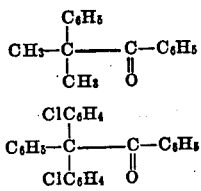

and

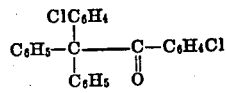

A sym-phenyl pinacol, the corresponding pinacolone, or a mixture of the two materials may be applied to living plants in a spray or dust. For sprays the active agent may be diluted with suitable solvents and applied in the form of an aqueous emulsion or the active agent may be carried on a finely divided solid, such as a clay, which is then suspended in an aqueous medium. Similarly, for dusts the active agent may be mixed with a solid diluent or coated on a finely divided solid and applied in a dry form. If desired, wetting, spreading, and sticking agents may be used in conjunction with the pinacols and pinacolones. Of these, the surface-active quaternary ammonium compounds, such as dodecyl dimethyl benzyl ammonium chloride, are exceptionally effective in conjunction with the phenyl pinacols or pinacolones.

Typical applications of the sym-phenyl pinacols and their corresponding pinacolones are shown in the following examples.

*Example 1*

(a) Benzpinacol was prepared from benzophenone by photosynthesis in the presence of isopropanol. It was dissolved in acetone and the resulting solution mixed with magnesium carbonate in the ratio of one pound of benzpinacol to four pounds of carrier. The solvent was then carefully driven from the mixture. The resulting solid was finely ground and used in aqueous sprays along with a small amount of wetting and sticking agents. At concentrations of 1% of benzpinacol there was complete control of Mexican bean beetle larvae on bean plants. Accordingly, the concentration of successive sprays was made smaller. At 0.125% the kill of bean beetle larvae was still 100% with only slight feeding and no plant injury. A comparison spray with 4 lbs. of magnesium arsenate per 100 gal. gave a kill of 40%. Tests were then made with benzpinacol at 0.02%. This spray controlled 99% of the bean beetle larvae with 86% of the larvae dead within 24 hours.

(b) Benzpinacol was prepared by reduction with a metal, zinc and hydrochloric acid being used. The product was likewise tested on a solid carrier. At 0.02% a control of 99% of bean beetle larvae was obtained, 93% of the larvae being killed within 24 hours and 6% having fallen incapacitated from the plant. There was very little feeding and no plant injury.

In connection with the above tests on benzpinacol, tests were also made of the value of benzophenone, $(C_6H_5)_2CO$, and its reduction product, $(C_6H_5)_2CHOH$. At concentrations of 1% of these, fairly good control of bean beetle larvae was obtained, but all plants were severely injured. When the concentrations were reduced to 0.5% to avoid the severe injury, these compounds were ineffective in controlling the larvae and the larvae fed freely upon the leaves.

*Example 2*

Some of the benzpinacone prepared as in the above example was warmed in the presence of acetic acid with a trace of iodine to convert it to the corresponding pinacolone, $(C_6H_5)_3CCOC_6H_5$. This pinacolone was coated on magnesium carbonate in the same way as the benzpinacone above. It was then applied to bean plants for tests against bean beetle larvae. A control of 100% of the larvae was obtained even at 0.02% concentration. There was no plant injury. Only slight feeding was observed.

*Example 3*

A pinacone of the formula $$C_6H_5(CH_3)C(OH) \cdot C(OH)C(CH_3)C_6H_5$$

was coated on clay from solvent and tested for the control of Mexican bean beetle larvae with satisfactory results. At one pound of this toxicant per 100 gallons of spray the control was 76% at the end of 24 hours with no plant injury and only slight feeding.

*Example 4*

The pinacone $$(4-ClC_6H_4(C_6H_5)(HO)C-)_2$$

was tested against bean beetle larvae on bean plants in the same way as the compounds shown above. The control at one pound of toxicant per 100 gallons of spray was 99% with no plant injury and very little feeding.

*Example 5*

A mixture containing 50% of benzpinacone and 50% of benzpinocolone was coated on clay from a solvent solution and the impregnated clay applied from aqueous spray onto bean plants infested with bean beetle larvae. Even at 0.02% of the mixed toxicants a control of 100% was obtained.

In other tests with the sym-phenyl pinocols exceptionally favorable control of a great variety of chewing insects was obtained. For example, Datana on oak trees were completely eliminated after a spray had been applied containing four-fifths of a pound of benzpinocal per hundred gallons of spray. In this case the benzpinocal was carried on a fine, neutral clay and cetyl dimethyl benzyl ammonium chloride was used as a spreading agent. Similar sprays containing one pound of benzpinacol, 1,2-diphenyl-1,2-dimethyl-1,2-dihydroxy ethane, or 1,2-dichlorophenyl-1,2-diphenyl-1,2-dihydroxy ethane per hundred gallons of spray controlled both the imported cabbage worm and the cabbage looper on cabbage. Sprays containing per hundred gallons one pound of benzpinacol, benzpinacolone, or the substituted derivatives thereof were found to be more than equal to sprays containing four pounds of calcium arsenate per hundred gallons in controlling the slug form of the Colorado potato beetle. At one pound per hundred gallons of spray benzpinacol eliminated an infestation of elm leaf beetle on elm trees. It was similarly effective in controlling the fall web worm on catalpa and oak trees.

Although the benzpinacols and benzpinacolones have been shown as the sole insecticidal agent, they may also be used in conjunction with other insecticidal materials such as rotenone, pyrethrins, nicotine, organic thiocyanates, oils, etc. They may also be used in conjunction with fungicides, such as cuprous oxide, copper oxychloride, etc. Such mixtures give a plurality of effects or a single improved effect.

The benzpinacols and their corresponding pinacolones are effective against chewing insects on plants at low concentrations, but are safely used at high concentrations. Because of their effectiveness, they prevent feeding to any noticeable extent. The pinacols having phenyl substituents and the corresponding pinacolones are tenaciously held on plants and resist removal by rain. They are exceptionally stable to air and light and remain effective in the field under the most severe conditions. At the concentrations required for controlling insects they appear to be entirely harmless to higher forms of life when plants carrying spray residues are ingested.

I claim:

1. An insecticidal composition having as an active insecticidal agent a member of the group consisting of pinacols having at least one phenyl substituent on each of the hydroxyl-bearing carbon atoms thereof, the pinacolones corresponding to said pinacols, and mixtures of said pinacols and pinacolones.

2. An insecticidal composition containing as an active insecticidal agent a pinacol having at least one phenyl substituent on each of the hydroxyl-bearing carbon atoms thereof.

3. An insecticidal composition containing as an active insecticidal agent a compound of the formula:

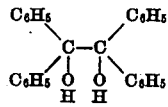

4. An insecticidal composition containing as an active insecticidal agent a compound of the formula:

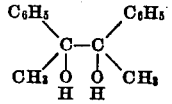

5. An insecticidal composition containing as an effective insecticidal agent a chlorophenyl pinacol.

6. An insecticidal composition containing as an effective insecticidal agent a compound of the formula:

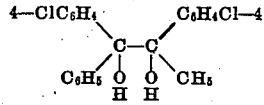

WILLIAM F. HESTER.